United States Patent
Liege et al.

(10) Patent No.: US 8,331,030 B2
(45) Date of Patent: Dec. 11, 2012

(54) OPTICAL SYSTEM PROVIDED WITH A DEVICE FOR AUGMENTING ITS DEPTH OF FIELD

(75) Inventors: Bruno Liege, Boulogne (FR); Regis Tessieres, Paris (FR); Frederic Guichard, Paris (FR); Etienne Knauer, Boulogne (FR); Hoang-Phi Nguyen, Paris (FR)

(73) Assignee: DXO Labs, Boulogne-Billancourt (FR)

( * ) Notice: Subject to any disclaimer, the term of this patent is extended or adjusted under 35 U.S.C. 154(b) by 197 days.

(21) Appl. No.: 12/671,997

(22) PCT Filed: Jul. 9, 2008

(86) PCT No.: PCT/FR2008/051280
§ 371 (c)(1),
(2), (4) Date: May 26, 2010

(87) PCT Pub. No.: WO2009/019364
PCT Pub. Date: Feb. 12, 2009

(65) Prior Publication Data
US 2011/0164323 A1 Jul. 7, 2011

(30) Foreign Application Priority Data
Aug. 3, 2007 (FR) .................................. 07 56947

(51) Int. Cl.
*G02B 27/10* (2006.01)
(52) U.S. Cl. ......................................................... 359/618
(58) Field of Classification Search .................. 359/618, 359/558
See application file for complete search history.

(56) References Cited

U.S. PATENT DOCUMENTS

| | | | |
|---|---|---|---|
| 5,748,371 A * | 5/1998 | Cathey et al. | 359/558 |
| 6,069,738 A | 5/2000 | Cathey, Jr. et al. | |
| 6,525,302 B2 | 2/2003 | Dowski, Jr. et al. | |
| 6,842,297 B2 | 1/2005 | Dowski, Jr. | |
| 6,873,733 B2 | 3/2005 | Dowski, Jr. | |
| 6,940,649 B2 | 9/2005 | Dowski, Jr. | |
| 7,025,454 B2 | 4/2006 | Cathey, Jr. | |
| 7,031,054 B2 | 4/2006 | Cathey, Jr. et al. | |

FOREIGN PATENT DOCUMENTS
FR 2880958 A1 7/2006

OTHER PUBLICATIONS

Yang et al., "Optimized phase pupil masks for extended depth of field" Optics Communications, North-Holland Publishing Co., Amsterdam, NL, vol. 272, No. 1, Jan. 20, 2007, pp. 56-66.

* cited by examiner

*Primary Examiner* — James Jones
(74) *Attorney, Agent, or Firm* — IM IP Law PLLC; C. Andrew Im

(57) ABSTRACT

In order to increase the depth of field of an optical system, there is provision to add a phase object, interposed between an object (O) to be imaged and an image plane (8) of the optical system. The phase object is interposed although a chromatic aberration of the system is not yet corrected. After interposition, the measured optical signal is corrected complementarily so as to eliminate the chromatic aberrations therefrom. It is shown that if a parameter of the expansion of the expression, a function of pupil dependency, that the difference in path length of the optical system possesses a significant value of higher order than that of the defocus, then an increase in the depth of field is obtained.

15 Claims, 13 Drawing Sheets

OPTICAL SYSTEM PROVIDED WITH A DEVICE FOR AUGMENTING ITS DEPTH OF FIELD

RELATED APPLICATIONS

This application is a § 371 application from PCT/FR2008/051280 filed Jul. 9, 2008, which claims priority from French Patent Application No. 07 56947 filed Aug. 3, 2007, each of which is herein incorporated by reference in its entirety.

TECHNICAL FIELD OF THE INVENTION

The subject of the invention is a device for increasing the depth of field of an optical system. Its object is to increase the depth of field of an optical system beyond its conventional limits.

BACKGROUND OF THE INVENTION

According to some nonlimiting examples, the optical system can be incorporated into an image acquisition system, which may be a disposable camera, a digital camera, a reflex camera (digital or non-digital), a scanner, a fax machine, an endoscope, a motion picture camera, a video camera, a surveillance camera, a toy, a camcorder or camera incorporated into or connected to a telephone, personal digital assistant or computer, a thermal camera, un ultrasound device, an MRI (magnetic resonance) imaging device, or an X-ray radiography device.

An image acquisition system generally comprises, in addition to an optical system whose role is to focus light, a sensor. Such a sensor comprises mechanical, chemical or electronic means for capturing and/or recording images.

The sensor is, for example, a system of photosensitive cells that transforms the quantity of light received into numerical values, and that assigns to each pixel the value or values that correspond to it. The unprocessed image acquired directly by the sensor is traditionally called the RAW image. The number of numerical values ultimately assigned to each pixel depends on the image capturing system.

OBJECT AND SUMMARY OF THE INVENTION

In a variant of embodiment, a numerical value is associated with a measurement by the sensor in each spectral band as defined according to the invention. The numerical values thus obtained are stored using storage means.

Preferably, according to the invention, processing means connected to the storage means process the stored data. What is meant by digital image processing means is, for example, a piece of software and/or a component and/or a piece of equipment and/or a system for modifying the quality of the image.

The digital image processing means can take many forms depending on the application.

The digital image processing means can be incorporated, in whole or in part, into the device, as in the following examples:
An image capturing device that produces modified images, for example a digital camera that incorporates image processing means.
A professional image capturing device that produces modified images, for example an endoscope that includes image processing means.
The digital image processing means can be incorporated, in whole or in part, into a computer. In that case, in practice the image processing means are compatible with multiple devices.

The optical system can have a fixed or variable focal length, a fixed or variable aperture, and a fixed or variable focus.

In the case of a conventional optical system with a fixed focal length, FIG. 1, the depth of field can for example be determined by the maximum acceptable size of the polychromatic image spot in the image plane of an object point O. This is particularly the case in the context of photography. In the case of a monochromatic incident wave and a perfect optical system, it is possible to define a maximum acceptable image spot size, designated by $\epsilon$ in FIG. 1. In order to have an image that is sharp at infinity and at the shortest possible distance, it is necessary to place the image sensor in an image plane, in the position represented in FIG. 1. This position corresponds to the intersection of the marginal rays coming from infinity and from the near distance defined by the object point O. In this special position, the blur spot for an object at infinity is identical to that obtained for an object placed at O.

Sharpness is directly related to the dimensions of the size of the image spot in the sense that the smaller the dimensions of the image spot, the greater the sharpness.

The image depth of field corresponds to the distance F'O', where F' is the focal point of the lens and O' is the image of O through the lens.

The object depth of field corresponds to the distance between the two extreme objects, in this case infinity and O. Given that, in this specific case, infinity will be sharp, it is generally more advantageous to look at the minimum distance (the object placed at O) for which the image will be sharp. The lower the value $\epsilon$, the farther the point O must be from the lens, and the smaller the depth of field.

A minimum distance $d_{minimum}$ for a conventional defect-free optical system is determined by the following formula in the context of an image sensor in the 4/3 format:

$$d_{minimum} = \frac{1}{2} \left( \frac{25 \cdot NMpixels \cdot 10^6 \cdot P}{96 \cdot \sqrt{2} \cdot \tan^2\left(\frac{FOV}{2}\right) \cdot f/\#} - \frac{5 \cdot \sqrt{NMpixels \cdot 10^6} \cdot P}{4\sqrt{3} \cdot \tan\left(\frac{FOV}{2}\right)} \right)$$

where NMpixels corresponds to the number of millions of pixels of the image sensor, P to the pixel size, FOV to the angle of view perceived by the lens and f/# to the aperture number of the lens.

Given the following parameters—f/#=2.8, FOV=65°, NMpixels=3 and P=2.8 µm—the minimum distance will be equal to 56 cm. This distance is to be compared with the 10 cm attainable with the present invention.

The above equation is an approximation, since it corresponds to the case of a perfect lens. However, it represents a good estimate of the depth of field attainable with a conventional optical system.

The above reasoning can be extended to the case of a zoom lens, which represents an optical system comprising several fixed focal lengths, or to a system for projecting images onto a screen, for example wall-mounted, the screen playing the role of the image plane (or conversely, playing the role of an object, when conventionally considering an inversion of the optical phenomenon, which is reversible).

Furthermore, many existing photographic devices are equipped with a so-called Auto Focus function, which corresponds to an automatic focusing function with a variable focal length. This focusing function is based on an image of a natural scene, seeking to obtain the best possible sharpness of that image. The principle of this function is that it seeks to position itself at the sharpest point for that image.

In the prior art, particularly in the devices developed by the Company DXO LABS, this depth of field can be extended by using longitudinal chromatic aberration and by subsequently processing the image obtained by means of the image sensor, as described in the document FR-A-2 880 958. In essence, a depth of field's sharpness range, the range in which the size of the image spot is below a predetermined threshold, is not the same depending on the color, the chromatic component of the light signal from the object to be captured in the image plane. It is thus possible to distinguish several sharpness ranges, for example three ranges, in accordance with the spectral components in question, for example, red, green and blue. It is therefore possible to arrange to have at least one sharp color per given distance range and to transfer the sharpness of the sharpest channel to the other two color channels.

In the example of FIG. 2, the variance of the image spot, on the ordinate, is represented as a function of the object distance, on the abscissa, and as a function of the spectral component. The curve having the highest ordinate at the origin is the curve of the red spectral component (wavelengths of between 600 nm and 700 nm). The intermediate curve is that of the green component (wavelengths of between 500 nm and 600 nm), and the curve having the lowest ordinate at the origin is that of the blue component (wavelengths of between 400 nm and 500 nm). It is therefore possible to divide the object distances into three zones. It is possible to define a so-called macro zone, for objects from 10 cm to 20 cm away from the optical system, in which the blue will be sharper than the green or the red. A portrait zone between 20 cm and 50 cm is the one in which the green will be sharper than the blue and the red. A landscape zone beyond 50 cm is the one in which the red will be sharper than the blue and the green. It would also be possible to define more (or fewer) zones and more (or fewer) color ranges.

Without any processing of the image after its capture, such an optical system produces a blurred image because of the chromatic aberration present. With a digital processing that makes it possible to transfer the sharpness of the sharpest channel to the other channels, it is possible to obtain a sharp image over a greater range of distances, in practice from 10 cm to infinity.

The chromatic aberration introduced into the optical system is controlled in order to obtain the desired depth of field.

The chromatic aberration present in the system being known, the digital correction of the image after its capture is performed in accordance with various distance ranges. In essence, depending on the value of the image spot for the three color channels, the distance between the object and the lens is evaluated and the digital correction of the image is adapted based on the distance found. The digital processing of the image is adaptive with respect to the object distance and therefore it is not necessary to have an image spot that is invariant with respect to object distance.

However, in the devices described in the documents U.S. Pat. Nos. 5,748,371, 7,031,054, 7,025,454, 6,940,649, 6,873,733, 6,842,297, 6,525,302, and 6,069,738, the system for increasing the depth of field with an optical system for capturing images in incoherent light or natural light, comprises a phase mask positioned between the object and the sensor. This phase mask, through its structure and its positioning, enables the image spot and the optical transfer function to be made uniform over a greater range of distances compared to the original optical system.

This modification is such that this function, see FIG. 16 of the document U.S. Pat. No. 5,748,371, must necessarily be insensitive to the distance between the object and the optical system in a range of object distances, relative to the optical system, that is greater with a phase mask than without a phase mask.

The interposed phase mask changes the phase of the transmitted light and has very little or no effect on the intensity of the light that passes through it. Moreover, the modified optical transfer function of the full system (phase mask plus optical system) is never cut off in at least one of the spectral bands that compose the incoherent light.

A processing associated with an image sensor makes it possible to increase the depth of field by inverting the alteration of the optical transfer function produced by the phase object.

The processing is applied identically no matter what the object distance, which is why it is important that the image spot be invariant over the entire distance range corresponding to the object depth of field. The same correction is applied whether the object is near or far because the object distance is unknown.

In contrast to these known techniques, the present invention relates to a device for increasing the depth of field of an optical system comprising an uncorrected longitudinal chromatism and comprising a phase object, also called a phase mask, interposed between the image plane of the optical system and the object, preferably at the level of the pupil or in a conjugate plane of the pupil.

Thus, the subject of the invention is an optical system equipped with a device for increasing its depth of field
  which processes incoherent light,
  this incoherent light being divided into at least two spectral bands, a first band and a second band,
  a center wavelength value of one band being different from a center wavelength value of the other band,
  which has a modulation transfer function,
  which has a lens for focusing the incoherent light received from an object onto an image plane,
  which has storage means for storing a representation of the light images due to the above-defined spectral bands that are received in the image plane, characterized in that it comprises
  an optical phase mask interposed between the object and the image plane,
  this optical phase mask having a quality of increasing the depth of field,
  this quality having the effect of modifying the modulation transfer function of the system, and particularly of measuring and/or modifying all or part of the effect on the image of the longitudinal chromatic aberration, in such a way that
  the modified modulation transfer function is significantly sensitive to the distance between the object and the lens, and
  the modified modulation transfer function has, for an object located in a first distance range near the lens and for the first spectral band, a value higher than a first threshold, and
  the modified modulation transfer function has, for an object located in a second distance range far from the lens and for the second spectral band, a value higher than a second threshold,
  the first and second distance ranges being larger with the presence of the optical phase mask than if it were not present, and
  processing means for measuring and/or correcting all or part of the effect on the image of a longitudinal chromatic aberration, these processing means being connected to the storage means for restoring the representation of the light image that is received in the image plane.

BRIEF DESCRIPTION OF THE DRAWINGS

The invention will be better understood by reading the following description and examining the figures that accompany it. The latter are presented only as examples and are not in any way limiting of the invention. The figures show.

DETAILED DESCRIPTION OF THE EMBODIMENTS

Figure 3:
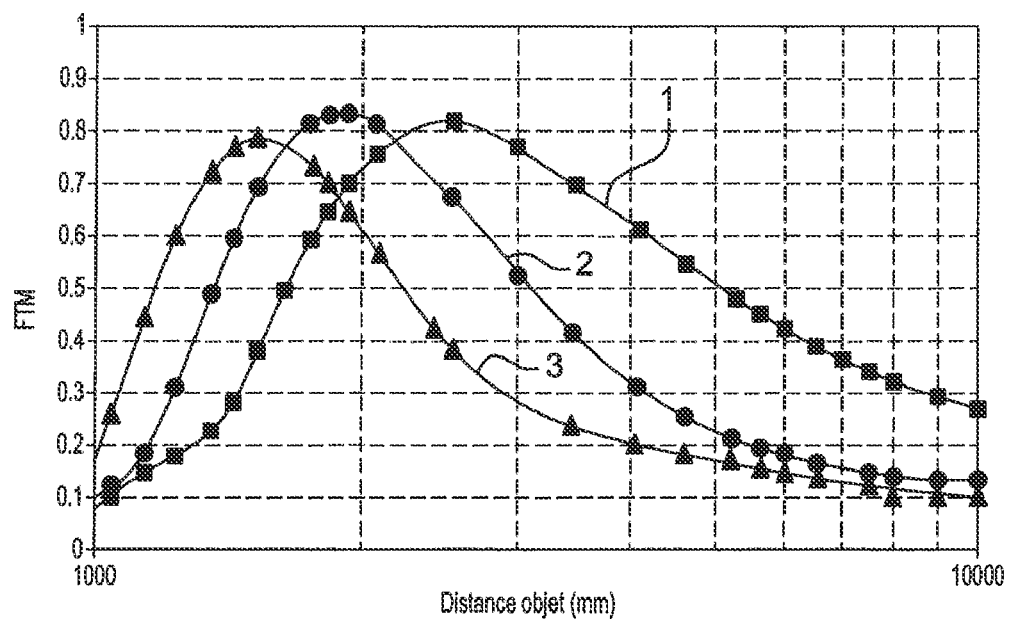
FIG. 3: modulation transfer function MTF curves for three different spectral bands (red, green, blue) for a lens having an uncorrected longitudinal chromatism.

An optical system in which the longitudinal chromatism has not been corrected has a modulation transfer function MTF that varies as a function of the wavelength of the incident light. More generally, the optical transfer function of the system is correlatively a modulation transfer function. This optical transfer function is linked to the image spot introduced previously by performing a Fourier transform of this image spot, considering only the modulus. Depending on the spectral band in question, the maximum MTF will be at different distances, as illustrated in FIG. 3. In FIG. 3, the MTF is represented by three curves 1, 2 and 3 for three different spectral bands (red, green, blue—respectively drawn with squares, circles and triangles) as a function of the object distance.

These three arbitrary bands are formed of spectral lines continuously distributed, for incoherent natural or pseudo-natural light, around a center line. A center wavelength value of a band, for example corresponding to 450 nm for the blue, is different from a value of another band, for example 650 nm for the red. The bands, in the context of white light, can partially overlap, or even be incorporated into each other. They are differentiated by the optical device or by the subsequent processing, which break down the light into multiple bands, i.e. into at least two bands. Preferably, if only two bands are chosen, they correspond to blue and red. Preferably, if only three bands are chosen, they correspond to blue, green and red.

In this FIG. 3, the MTF for the blue spectral band is maximal for nearer distances than the red spectral band. But the MTFs could all also be inverted, making the MTF for the red spectral band maximal for near distances, and the MTF for the blue spectral band maximal for far distances.

Figure 1:
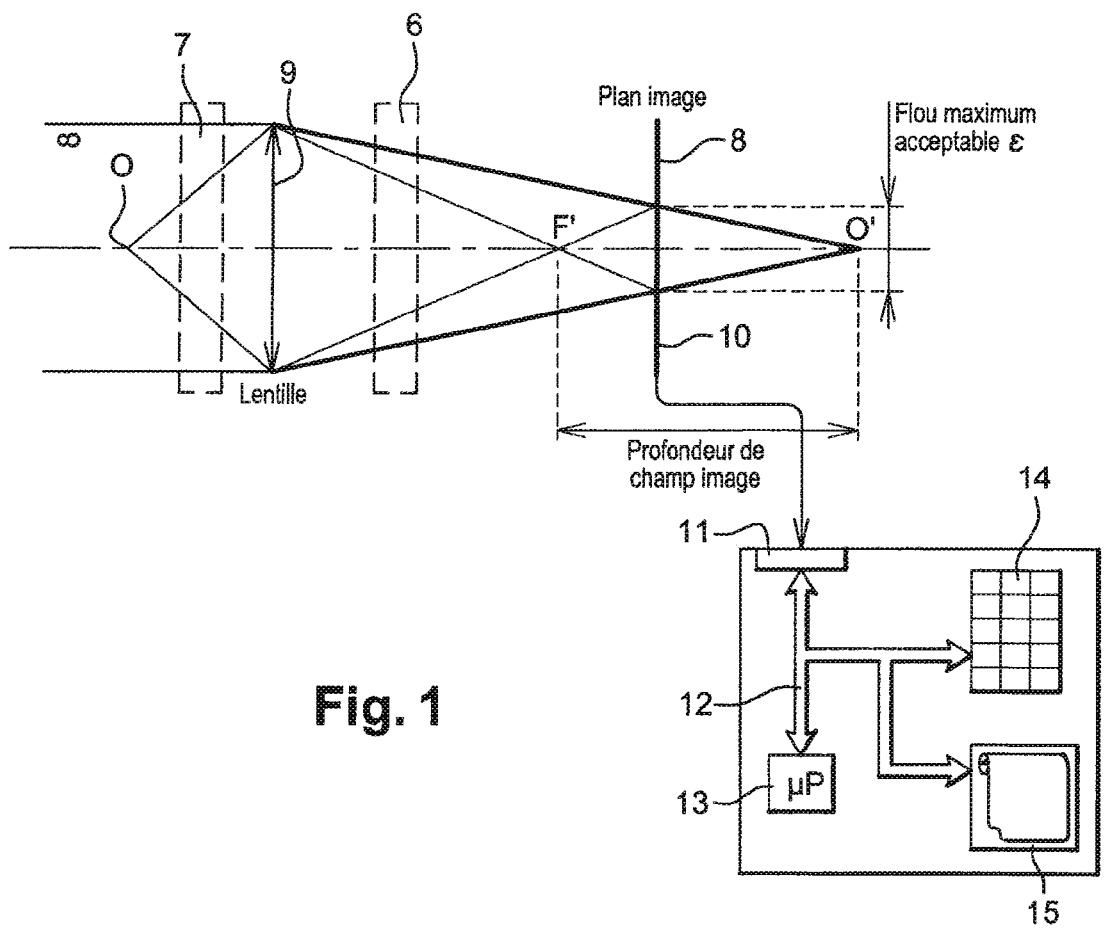
FIG. 1: already partly discussed, a schematic diagram of a conventional optical system, augmented by the device of the invention.
Figure 2:
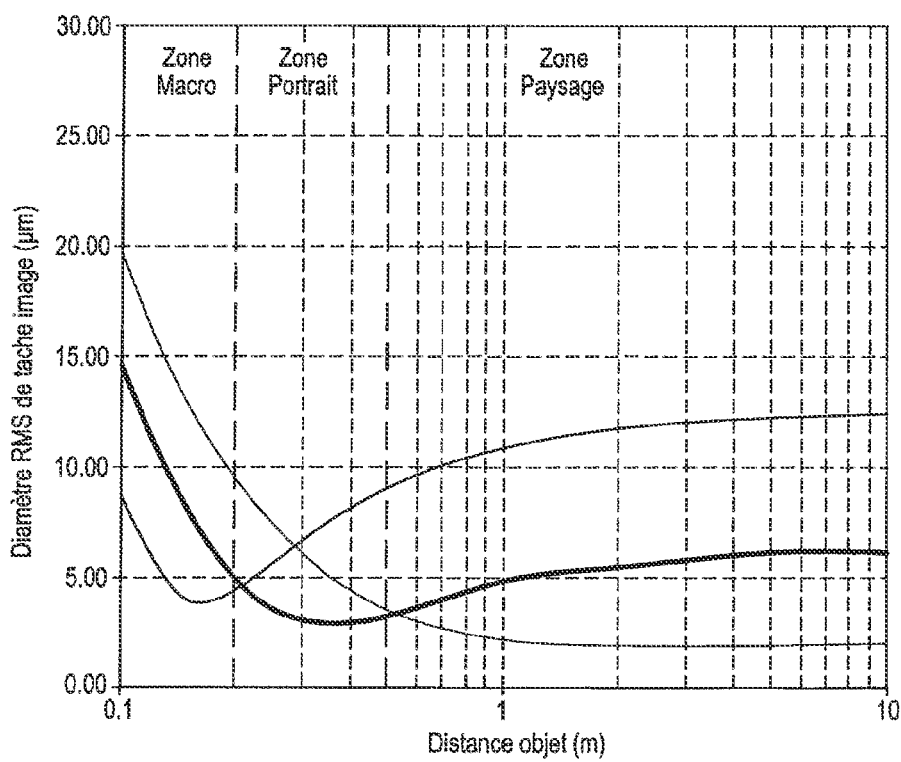
FIG. 2: already discussed, a representation of the image spot size as a function of the object distance for the three channels—red, green, blue.

The principle of using a phase object in the present invention is to increase the depth of field by expanding the MTFs of each spectral band without the need to have an MTF that is invariant with distance. FIG. 1 thus shows a phase object 6 or a phase object 7 interposed between the object O and the image plane 8, on either side of the lens 9. It would be conceivable to have two phase objects 6 and 7. Preferably, the lens 9 forming the entry side of the optical system being fixed to a housing of this system, the phase object is placed downstream, between the plane 8 and the lens 9. An image sensor 10 of the optical system is placed in the location of the image plane 8. The sensor 10, and more generally the storage means, can comprise a charge transfer device 10, a film, or a video camera. The storage means include the sensor 10 connected to a processing device comprising, as represented schematically, an interface 11 connected by an address, data and control bus 12 to a microprocessor 13, a data memory 14, and a program memory 15. A program stored in the memory 15 can include a digital processing filter 15.

Depth of field can be defined as the range of distances in which the MTF is higher than a predetermined threshold for a predetermined spatial frequency range. This frequency range can be determined to be, for example, between 0 and a maximum value that can be, for example, determined according to the sensor to be the Nyquist frequency. It can be expressed in the object or image space. In FIG. 3, if 0.2 is considered to be the threshold for the MTF at 10 lp/mm for the blue spectral band, curve 3, then the depth of field for this spectral band is 3 m because the MTF is above the predetermined threshold of 0.2 between approximately 1 and 4 m. For the red band, curve 1, if 0.3 is considered to be the threshold, the depth of field is 7.5 m because the MTF is above the predetermined threshold of 0.3 between 1.5 and 9 m.

In this example, only one threshold was considered for the near and far distances, but it would be conceivable to consider different predetermined thresholds based on different distance ranges for each spectral band.

One of the elements of the present invention is to add a phase object 6 and/or 7 in order to increase this depth of field. This object has the effect of widening the (image and/or object) distance range in which the MTF is above one or more predetermined thresholds for at least two different spectral bands. The predetermined threshold or thresholds for each spectral band are different, but they could also be identical.

Figure 4:
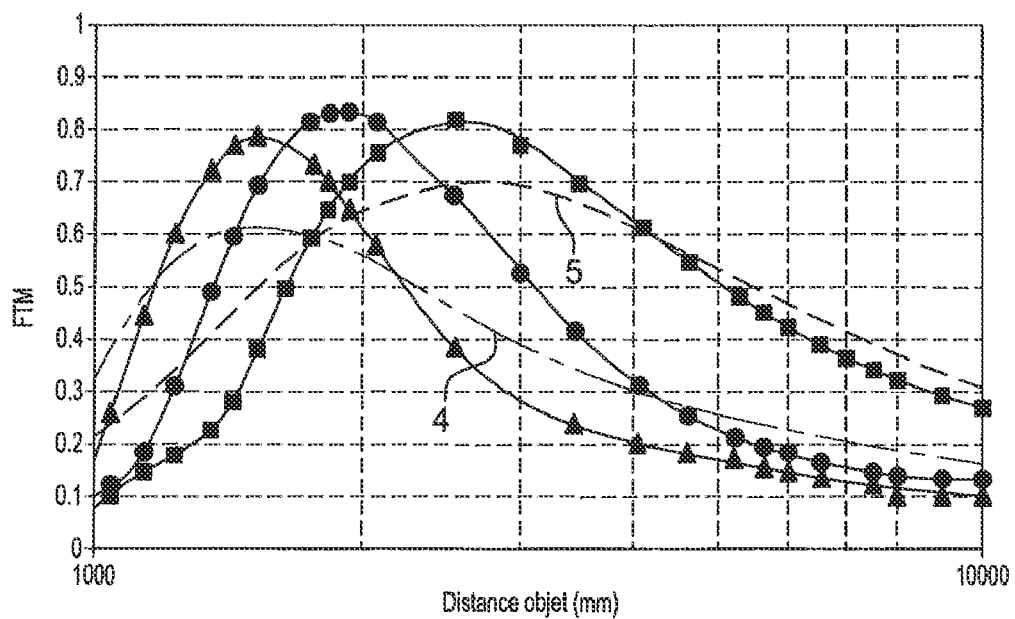
FIG. 4: MTFs as a function of the object distance for three different spectral bands (red, green, blue), for a lens having an uncorrected longitudinal chromatism in solid lines, and for the two extreme spectral bands (blue and red) in the context of the invention in dotted lines.

The effect of the phase object is illustrated in FIG. 4. The phase object placed between the object and the image makes it possible to increase the depths of field for the blue and red spectral bands. In fact, the blue MTF, curve 4, is above the predetermined threshold of 0.2 between 80 cm and 7 m and the depth of field is consequently increased from 3 m to 6.2 m. As for the red MTF, curve 5, it is above the predetermined threshold of 0.3 between 1.2 m and 10 m and the depth of field is consequently extended from 7.5 m to 8.8 m.

The maxima of the curves are less high with the phase object present in the optical system. But given that the MTFs of the two spectral bands are higher than their respective predetermined thresholds in larger distance ranges, the depths of field have been extended and the resulting losses of contrast can be compensated by digital processings.

According to the invention, the MTFs are not required to be insensitive to the lens object distance, and in this case they are not since they have a peak. In fact, thanks to the use of the longitudinal chromatic aberration, an estimate of the distance is performed by digital processings so as to adapt the correction of the image to the distance from the object. This is very advantageous compared to the existing techniques because it is possible to have an MTF that is variable as a function of distance, which gives greater flexibility. It is thus possible to obtain a depth of field greater than what can be obtained in the context of the documents U.S. Pat. Nos. 5,748,371, 7,031,054, 7,025,454, 6,940,649, 6,873,733, 6,842,297, 6,525,302, and 6,069,738. In addition, this makes it possible to obtain a better image quality because the loss of contrast obtained in order to increase the depth of field is lower in the context of the present invention. Consequently, the final image quality obtained after processing will be superior.

The present invention therefore has a considerable advantage relative to the existing technologies in the sense that it is not necessary to have an MTF that is invariant over the entire distance range thanks to the additional intelligent use of a device or method for correcting the longitudinal chromatic aberration. The latter, which is preferably of the type described in the document FR-A-2 880 958, is formed by a program stored in the memory 15, used by the microprocessor 13 to produce a corrected image stored in the memory 14. Preferably, this processing filters the image so as to give a spectral band a sharpness measured in another spectral band. The chromatic aberration can be corrected because it has been introduced in a controlled way into the optical system.

Moreover, it is not even necessary to have an MTF that is invariant in each distance range because the only constraint is to have at least one channel above a threshold defined by the image processing performed.

Figure 5A:
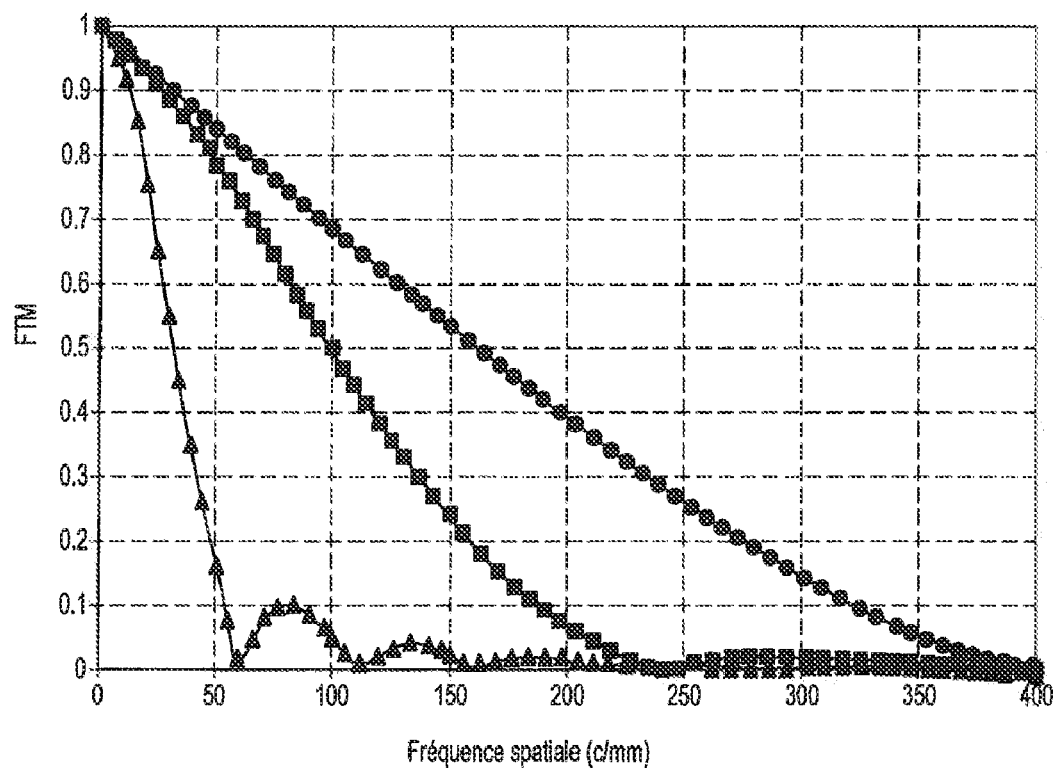
FIGS. 5a and 5b: an MTF illustrating the influence of a defocus on the MTF as a function of the spatial frequency, with and without a phase object.

Furthermore, the MTF has more high spatial frequencies when the optical system is defocused, thanks to the phase object, which has the effect of eliminating the cutoffs present without the phase object. In fact, when the optical system is defocused, i.e., when the image sensor is not placed in the location on which the rays are focused, this is known to have the effect of producing cutoffs in the MTF, as illustrated in FIG. 5a. FIG. 5a represents the MTFs of a perfect diffraction-limited system opened to f/5 for the wavelength $\lambda=500$ nm for various positions of the object when the image sensor is fixed. The first curve with the round symbols represents the case where the object is placed at a distance such that its conjugate in the image space is placed exactly at the location of the image sensor. The second curve with the square symbols represents the case where the object is offset from the previous object position on the optical axis by a quantity $\delta z1$. A cutoff and a jump appear on the MTF curve. The jump corresponds to an inversion of contrast. This phenomenon is known to the person skilled the art for any optical system that is defocused. The last curve with the triangular symbols represents the case where the object is offset by a quantity $\delta z2$ such that $\delta z2 > \delta z1$. This illustrates the fact that the further the object is from the conjugate of the point corresponding to the position in which the image sensor is located, the more cutoffs and inversions of contrast the MTF will have.

Even if digital processing is applied to the image, it is impossible to increase the MTF so as to obtain a sharp image if the MTF has been cut off for a given spatial frequency. Information cannot be created once it has been lost. None of the frequencies higher than the first cutoff can be recovered. In the curves of FIG. 5a, the high frequencies turn out to have been lost.

Figure 5B:
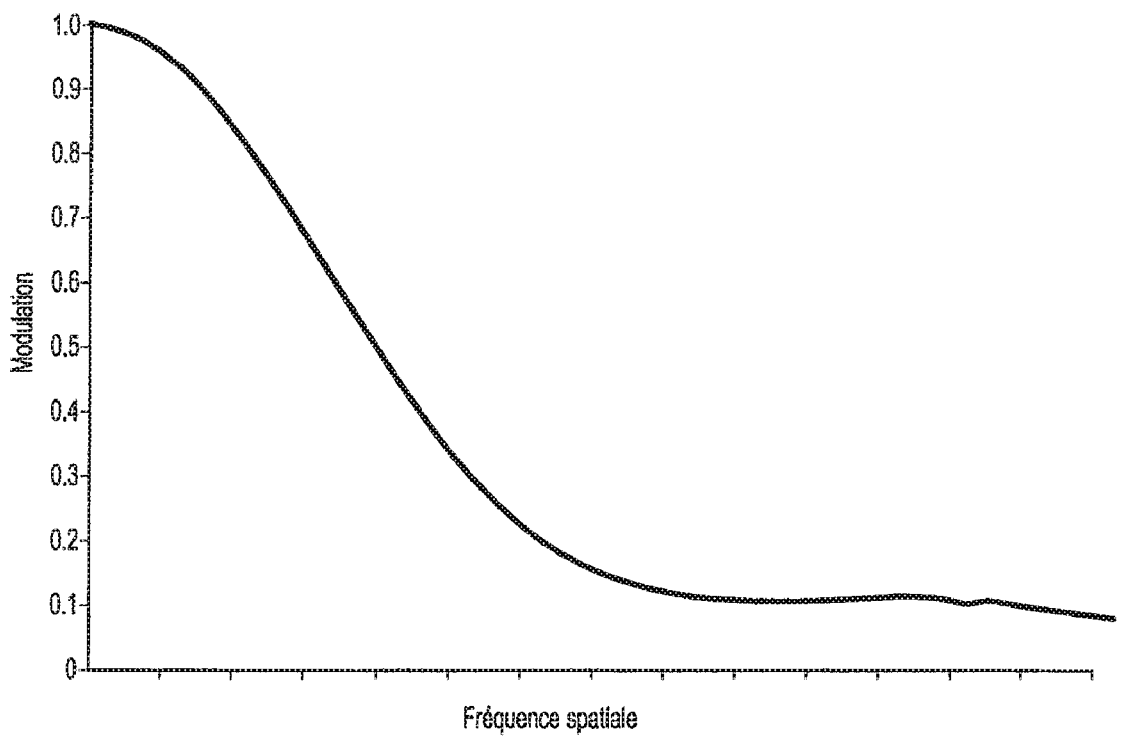
Figure 6:
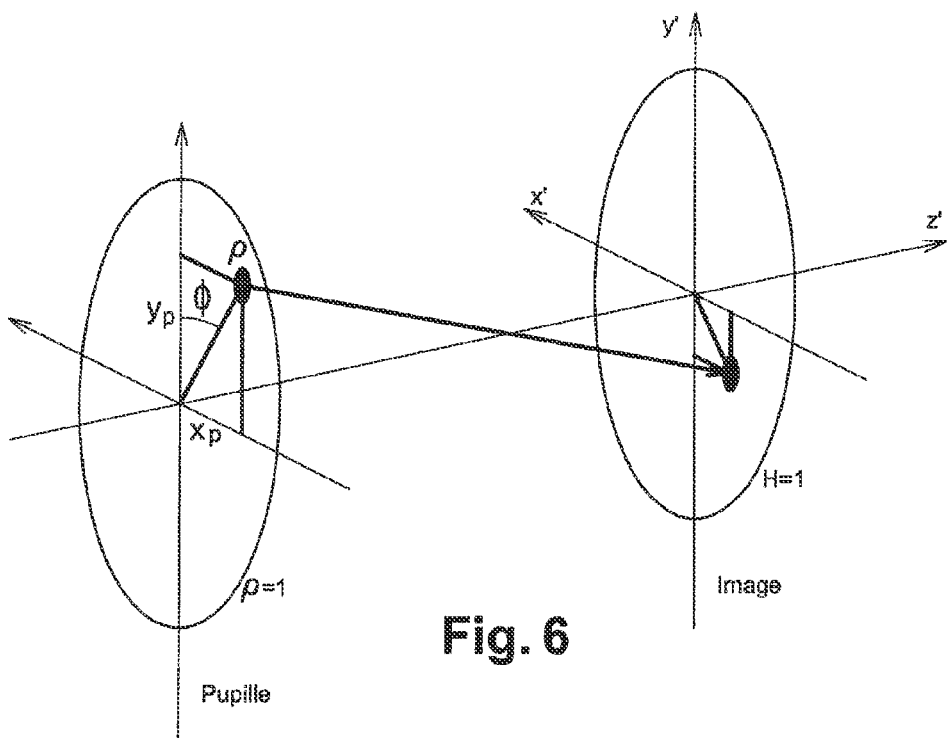
FIG. 6: a representation of the coordinate system for expressing the aberrations.

The high spatial frequency domain represents small objects and details. It is advantageous to be able to preserve them so as to obtain a good final image quality. FIG. 5a shows the MTF as a function of the spatial frequency for a system without a phase object. A cutoff of the MTF is present, whereas for a system with a phase object, this cutoff no longer appears, as illustrated in FIG. 5b, because the effect of defocusing the object is offset by the phase object introduced into the optical system. The method for offsetting the defocus is also illustrated below.

One effect generally observed when sharpness filters are applied to an image in order to improve its detail by increasing the high frequencies is known as "ringing," which has the secondary effect of overly increasing the low frequencies (MTF higher than 1) of the artifacts appearing in the image. These artifacts appear in the form of edge or contour effects. For example, taking the image of a black disk on a white background, a white ring at the level of the transition, which will have a higher luminosity than the white background, and a black ring, which will have a lower luminosity than the black disk, will be seen to appear. But thanks to the combined use of a phase object according to the present invention and the teaching of the method described in the document FR-A-2 880 958, it is possible to reduce the contrast (reduction of the low frequencies) prior to processing and to limit this effect.

Figure 8:
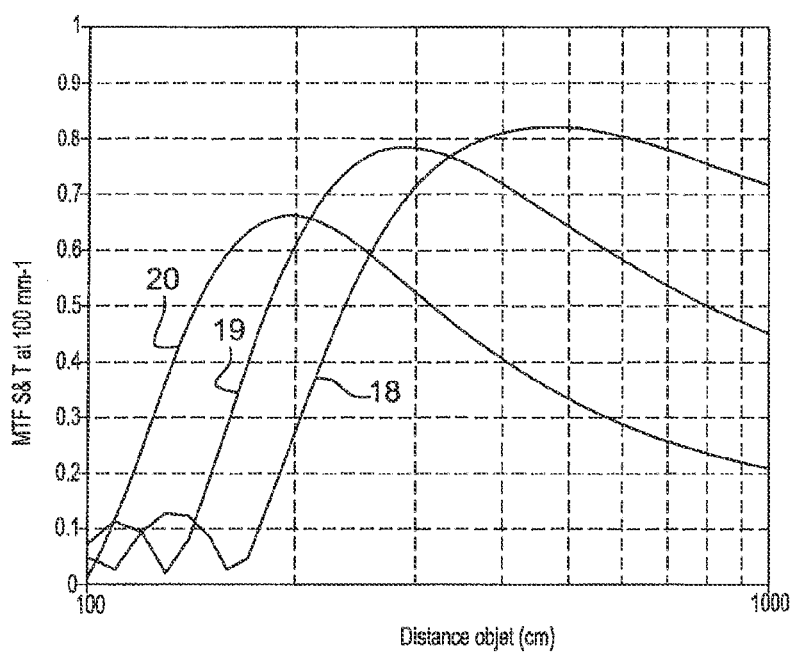
FIG. 8: MTFs as a function of the object distance for the spherical lens of FIG. 7 with the front aperture, the curve with the highest peak being that of the red, the one without a jump being that of the blue.

The principle of the phase object (illustration of the effect of increasing the depth of field):

A conventional method for representing the aberrations in a centered and symmetrical system is to use wavefront expansion as a function of the field and the pupil coordinates, as given in FIG. 8. This expansion was published for the first time by H. H. Hopkins.

$$W = \sum_j \sum_p^\infty \sum_n^\infty \sum_m^\infty (W_{klm})_j H^k \rho^l \cos^m \phi$$

$$k = 2p + m$$

$$l = 2n + m$$

where W represents the path difference present in an optical system, H represents the position in the image field and $\rho$ and $\phi$ are the polar coordinates in the pupil, with $\rho \sin \phi$ and $\rho \cos \phi$ being the components along the axes $\vec{x}$ and $\vec{y}$.

The expansion of the above expression to the third order is:

$$W = W_{020}\rho^2 + W_{040}\rho^4 + W_{131}H\rho^3 \cos\phi + W_{222}H^2\rho^2 \cos^2\phi + W_{220}H^2\rho^2 + W_{311}H^3\rho\cos\phi$$

where $W_{020}$ represents a so-called defocus parameter that can be easily attached to the defocus, $W_{040}$ is third-order spherical aberration, $W_{131}$ is third-order coma aberration, $W_{222}$ is third-order astigmatism, $W_{220}$ is field curvature, and $W_{311}$ is third-order distortion.

The phase object according to the invention must therefore have a parameter of its expansion with significant value, for a pupil dependency of a higher order than that of the defocus, which is at $\rho^2$ in order to have a function for increasing the depth of field. The aim is to use an object that introduces a defect greater than the defocus. Unlike in the existing techniques, the phase object does not need to compensate for all of the desired defocus and to thus obtain an MTF that is completely invariant with defocus.

Referring to the above equation, only two third-order aberrations have pupil dependencies greater than the defocus: coma and spherical aberration. The problem with coma (cubic defect) is that the object is not symmetrical. This poses problems during the assembly phase of the optical system. From this point of view, spherical aberration is a defect that is much easier to use because of its symmetry.

Figure 16:
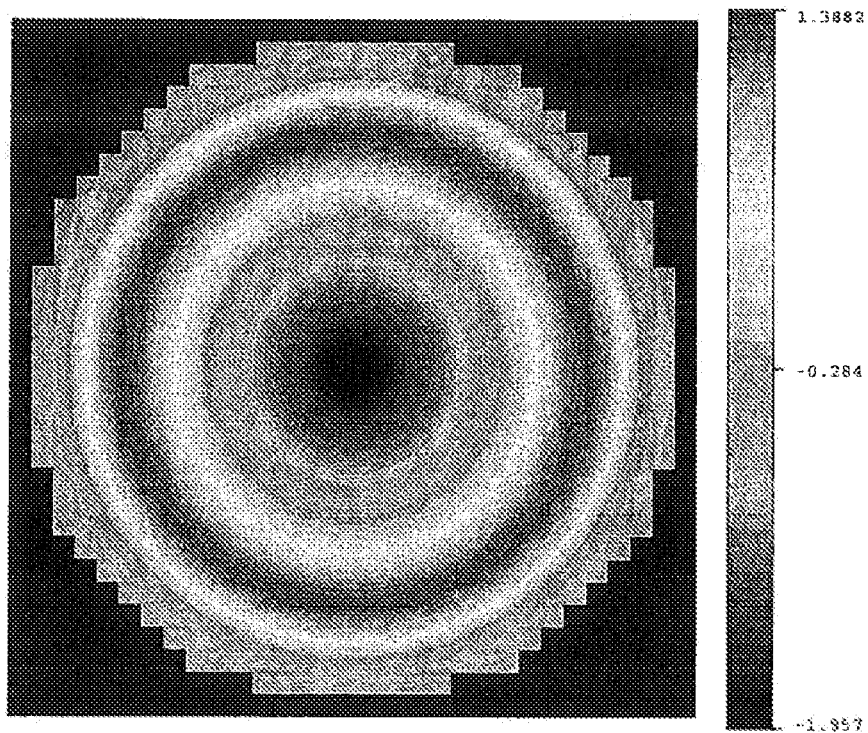
FIG. 16: an example of an interposed phase object according to the invention, corresponding to a combination of spherical aberrations of different orders 3, 5, 7, 9.
Figure 17:
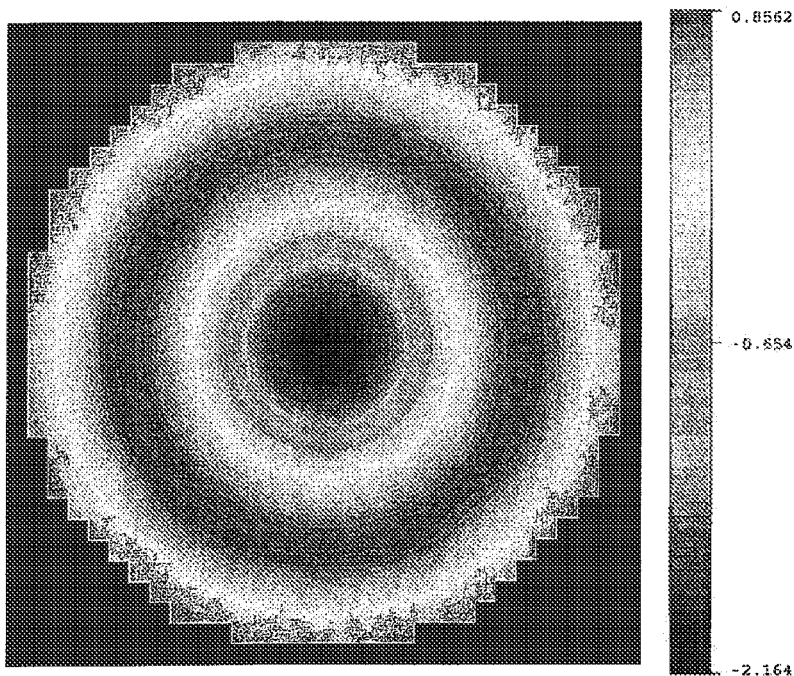
FIG. 17: an example of an interposed phase object according to the invention, corresponding to a combination of spherical aberrations of different orders 3 and 5.

It is also possible to introduce defects that have a pupil dependency greater than the defocus using higher order aberrations, like Trefoil and fifth-order spherical aberration, which are fifth-order aberrations, or using a combination of several aberrations. For example, it is possible to conceive of a combination of spherical aberrations of different orders, as shown in FIGS. 16 and 17.

The preferred position for the placement of the phase object is at the level of the pupil of the system because the phase object will have the same effect no matter what the field in question. It is possible, however, to place the object in a different location than the pupil. For example, this other plane is an image plane of a main plane of the optical system, between the object and the storage means 10. This can make it possible, for example, to correct field aberrations present in the original system without a phase object.

Figure 7:
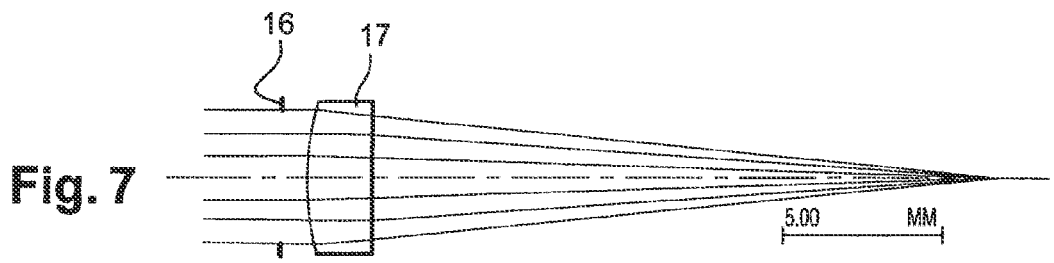
FIG. 7: a spherical lens, for example made of NBK7 from Schott, with a front aperture.

To illustrate the present invention, FIG. 7, a simple optical system is considered here. This optical system is composed of an aperture 16 with a diameter of 8.1 mm and a lens 17 made of NBK7 (glass from Schott) with a thickness of 4 mm and a diameter of 10 mm.

The distance between the aperture and the lens is 1.72 mm.

The radius of curvature of the front surface of the lens is 23.58 mm and the radius of curvature of the rear surface of the lens is −157.82 mm.

The MTFs as a function of the object distance for the system described above are represented in FIG. 8. As may be seen in this figure, the longitudinal chromatism has not yet been corrected. The three channels (red 18, green 19, blue 20) are clearly separated.

The phase object of the invention has aberrations in its wavefront expansion, including a defocus with a pupil dependency of a given order as a function of the image plane pupil distance. The solution therefore includes a phase object having a significant aberration with a pupil dependency of a higher order than that of the defocus.

Figure 9:
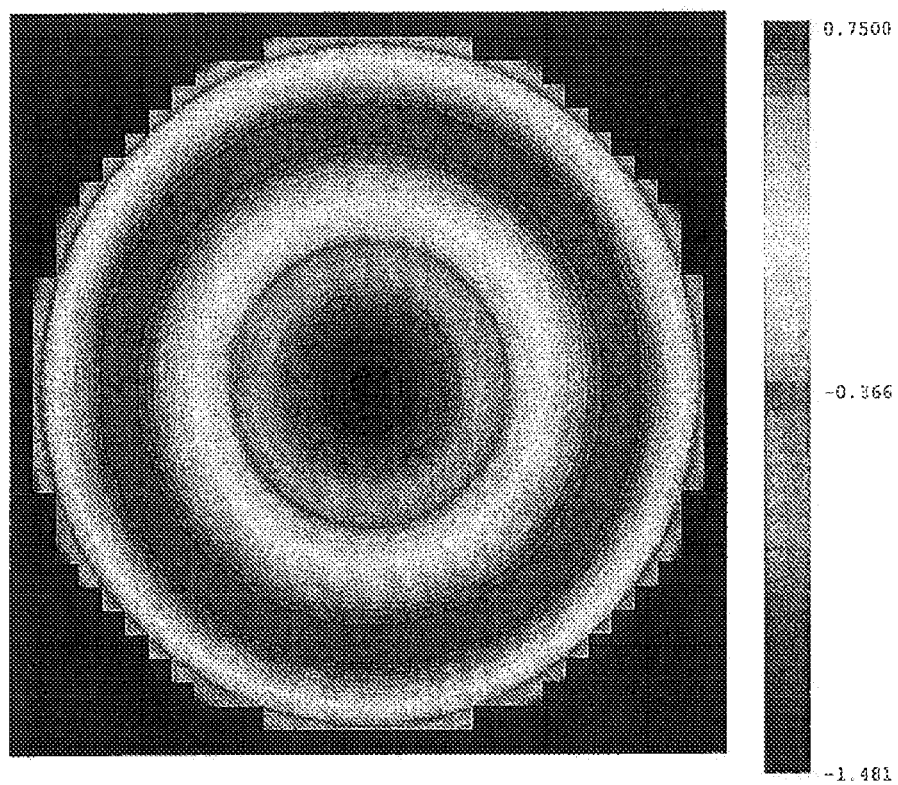
FIG. 9: an example of an interposed phase object according to the invention having a wave surface variation of the spherical aberration type.

When the phase object shown from the front in FIG. 9 is introduced into the above system, the depths of field of the various spectral bands are increased. The scales to the right of the figure give the thickness amplitude of the phase object in wavelength units for a wavelength equal to 500 nm. The longitudinal chromatism is still not corrected. To illustrate this point, the MTFs with and without a phase object for the three spectral bands—blue, green and red—are respectively given in 21 and 22 in FIG. 10, in 23 and 24 in FIG. 11, and in 25 and 26 in FIG. 12. In order to allow an equivalent comparison of the MTFs, the position of the image sensor relative to the lens has been adapted in each configuration.

The MTFs of the optical system without a phase object are represented in solid lines without symbols and the MTFs in which the phase object is present are represented with curves having symbols (triangles for the blue, diamonds for the green, and squares for the red). Thresholds for evaluating the depths of field were considered; they are represented in dotted lines. In this example, the threshold was set at 0.2 for the blue, 0.3 for the green and 0.2 for the red. In considering these thresholds, the increase in the depth of field for each of the spectral bands is considerable, as may be seen in the figures and in the following tables (Table 1 and Table 2).

TABLE 1

Distances for which the MTF is above the predefined threshold for the optical system without a phase object.

| Spectral band | Blue | Green | Red |
|---|---|---|---|
| Near distance at which the MTF is above the threshold | 110 cm | 150 cm | 165 cm |
| Far distance at which the MTF is above the threshold | 600 cm | 950 cm | Infinity |

TABLE 2

Distances for which the MTF is above the predefined threshold for the optical system with a phase object.

| Spectral band | Blue | Green | Red |
|---|---|---|---|
| Near distance at which the MTF is above the threshold | 100 cm | 130 cm | 125 cm |
| Far distance at which the MTF is above the threshold | 850 cm | 1350 cm | Infinity |

Figure 10:
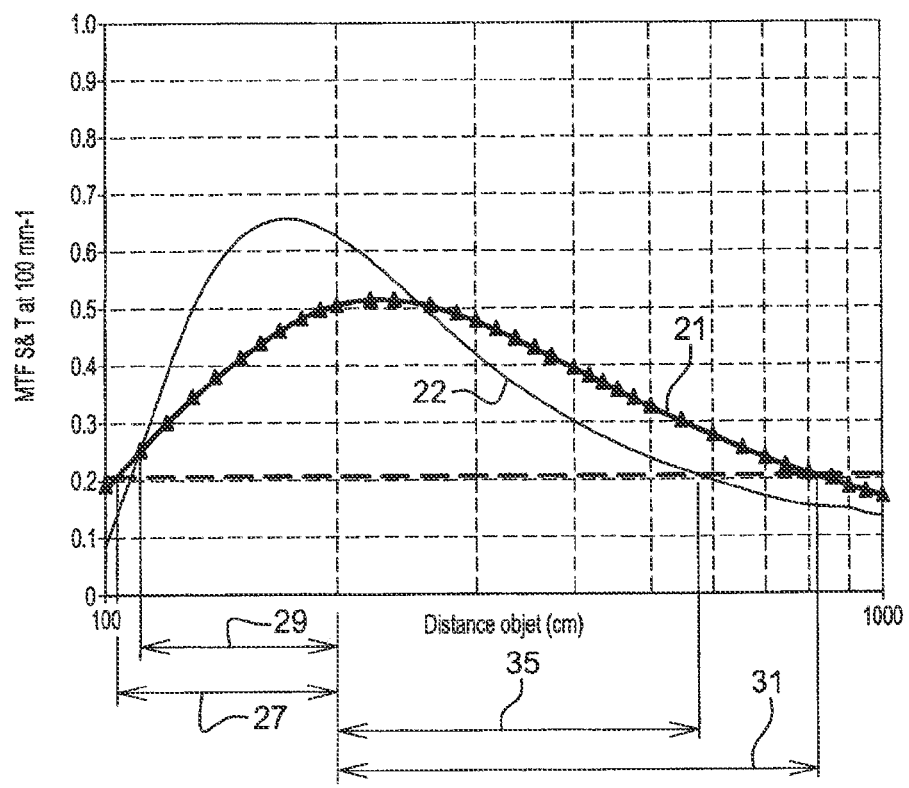
FIG. 10: MTFs as a function of the object distance, for the blue, with (curve with triangles) and without (curve in a solid line) the phase object of FIG. 9. The threshold is considered to be 0.2. The depth of field is greater when the phase object is present in the system.
Figure 11:
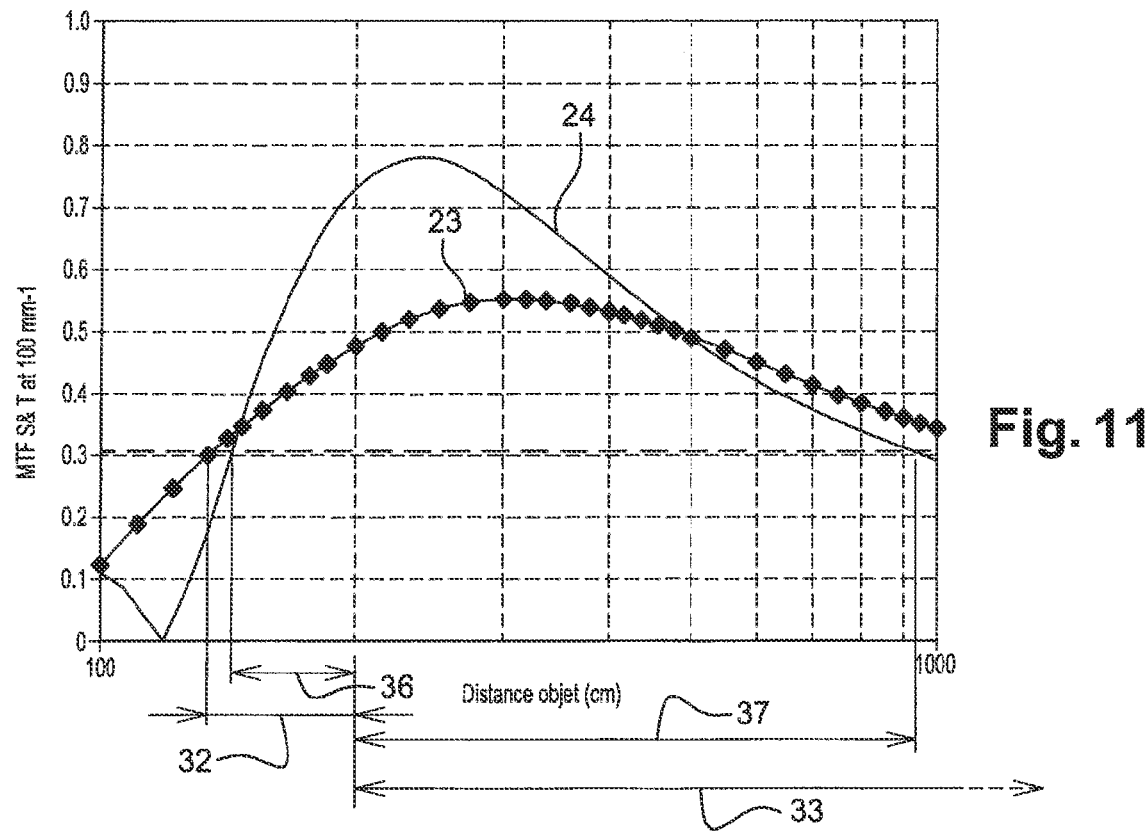
FIG. 11: MTFs as a function of the object distance, for the green, with (curve with diamonds) and without (curve in a solid line) the phase object of FIG. 9. The threshold is considered to be 0.3. The depth of field is greater when the phase object is present in the system.
Figure 12:
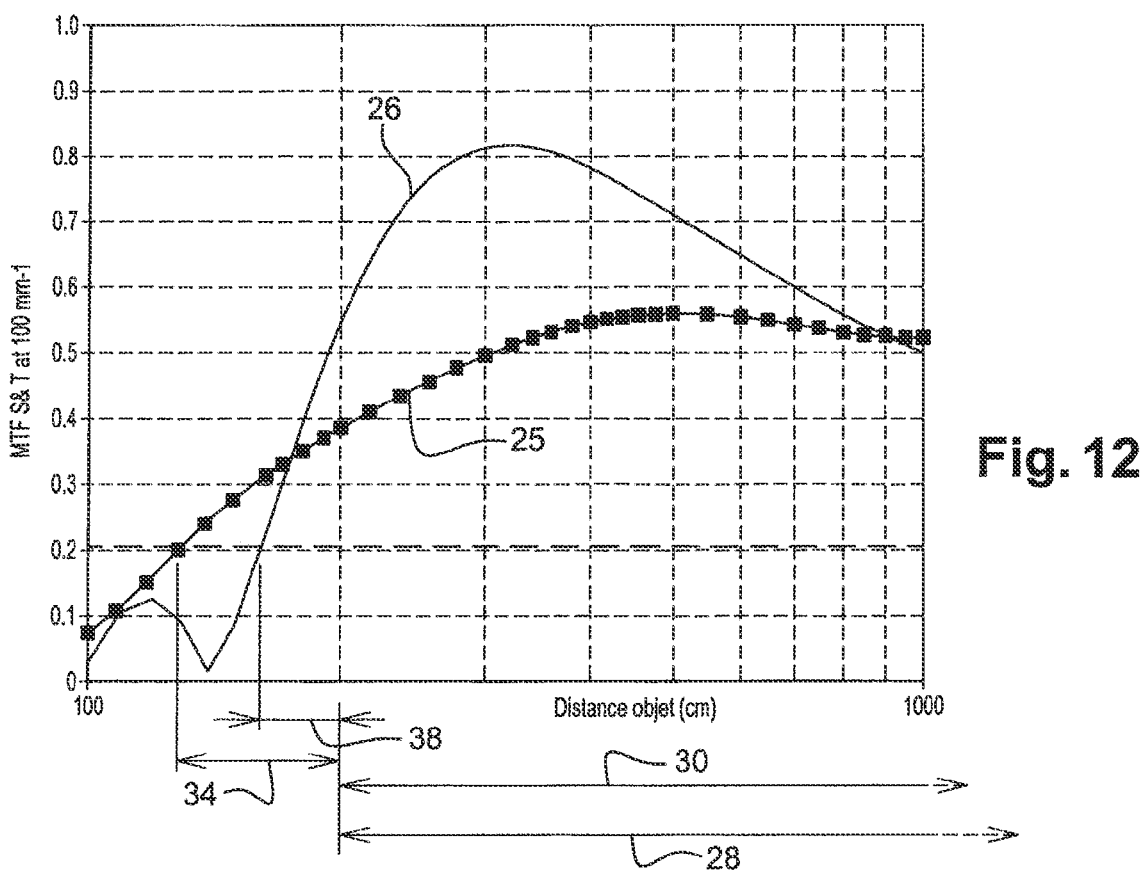
FIG. 12: MTFs as a function of the object distance for the red, with (curve with squares) and without (curve in a solid line) the phase object of FIG. 9. The threshold is considered to be 0.2. The depth of field is greater when the phase object is present in the system.

FIGS. 10 through 12 thus show, according to the invention, that the feature for modifying the modulation transfer function of the system is such that, FIG. 10, the modified modulation transfer function 21 is significantly sensitive to the distance between the object and the lens. In fact, except at infinity, its value changes as a function of the distance from the object. This modified MTF 21 has, for an object located in a first distance range 27 near the lens and for the first spectral band, in this case the blue, a value higher than a first threshold, in this case 0.2. At the same time, the modified modulation transfer function has, FIG. 12, for an object located in a second distance range 28 far from the lens and for the second spectral band, in this case the red, a value higher than a second threshold value, in this case 0.2. Both the first distance range 27 and the second distance range 28 are larger with the presence of the phase object than if it were not present. Correspondingly, it is noted that the ranges 29 and 30 are not as large.

The improvement is across the board because, whatever the wavelength range, the distance ranges 31-34 with the presence of the phase object are larger than the corresponding distance ranges 35-38 without a phase object. For simplicity's sake, the ranges were set relative to the pivot distance of 2 m, but the explanation is not tied to that pivot distance.

It is possible to obtain the same phenomenon by introducing deformations in the wavefront like those presented in FIGS. 13, 14, 15, 16 and 17. All of these defects make it possible to offset the effect of the defocus, i.e. to have a pupil dependency of a higher order than the defocus.

Figure 13:
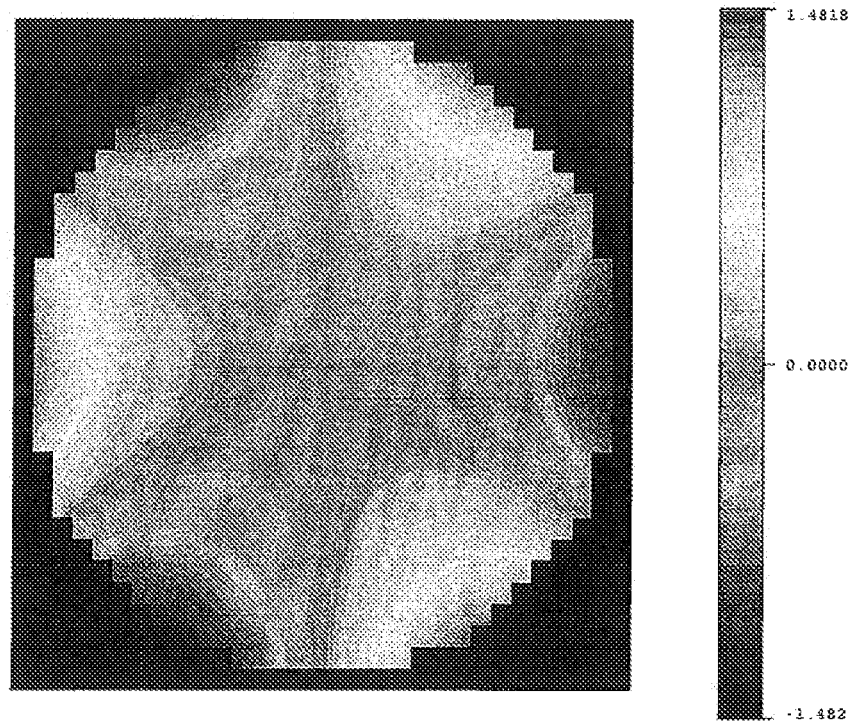
FIG. 13: an example of an interposed phase object according to the invention and having a wave surface variation of the Trefoil type.
Figure 14:
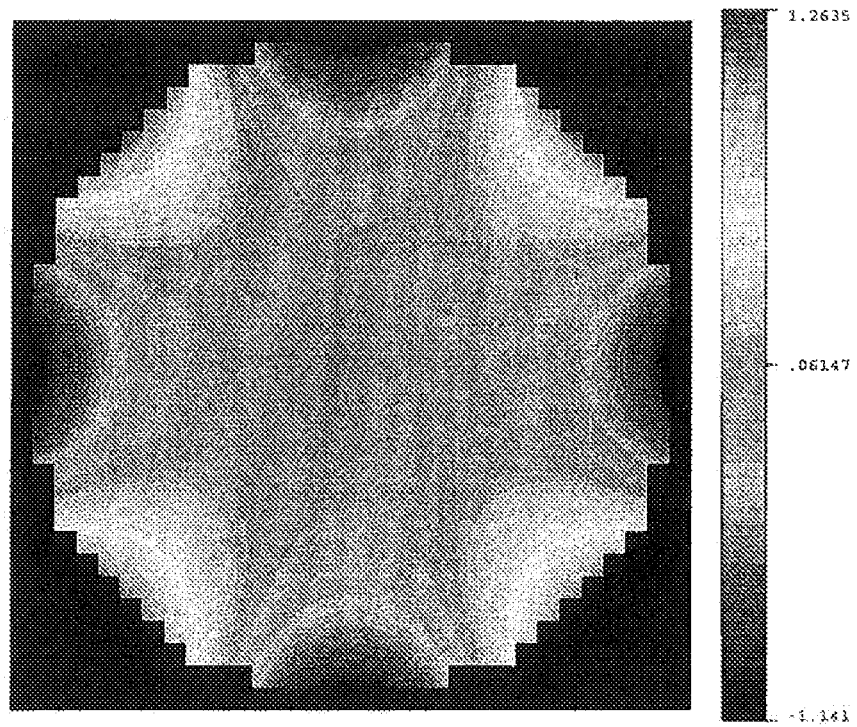
FIG. 14: an example of an interposed phase object according to the invention and having a wave surface variation of the Quadrifoil type.
Figure 15:
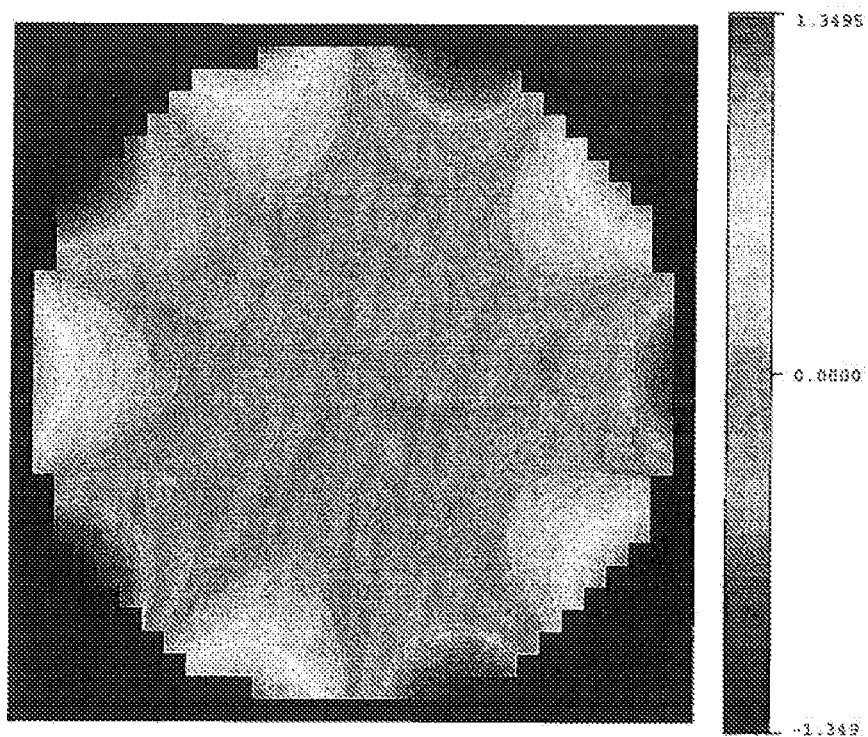
FIG. 15: an example of an interposed phase object according to the invention and having a wave surface variation of the Pentafoil type.

It should be noted that the deformations of FIGS. 13 through 15 (Trefoil, Quadrifoil and Pentafoil) are not symmetrical in rotation. Consequently, depending on the orientation of the phase object relative to the image sensor, its influence will differ. But the more peaks and valleys considered, the more this effect this will be minimized. For example, the effect will be less marked in the context of Pentafoil than in the case of Trefoil.

The phase object is a mask that preferably produces a quartic phase modulation as a function of the frequency.

The phase objects presented above may be refractive or diffractive.

Figure 18:
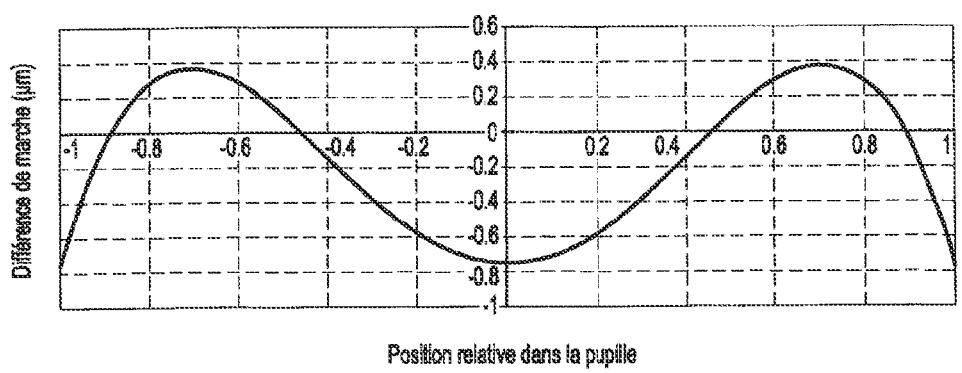
FIG. 18: a slice of a wavefront defect in micrometers due to the phase object represented in FIG. 9.
Figure 19:
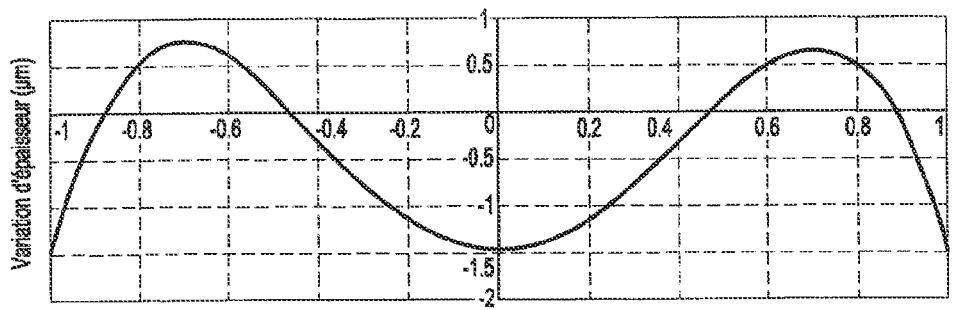
FIG. 19: a variation in thickness in micrometers to be obtained in a flat plate, based on its position relative to the pupil of the optical system for creating a refractive phase object.

Given the deformation of the wavefront represented in FIG. 9, a slice of which is shown in FIG. 18, it is possible to introduce it in a flat and parallel plate made of NBK7 whereof one surface has a proportional variation in thickness as shown in FIG. 19. In essence, this is possible because the variation in thickness is equal to $$\frac{\delta}{(n-1)}$$

where δ represents the path difference and n represents the index of the material (in this case the plate is made of NBK7, whose index is equal to 1.5168). This object will be refractive.

Figure 20A:
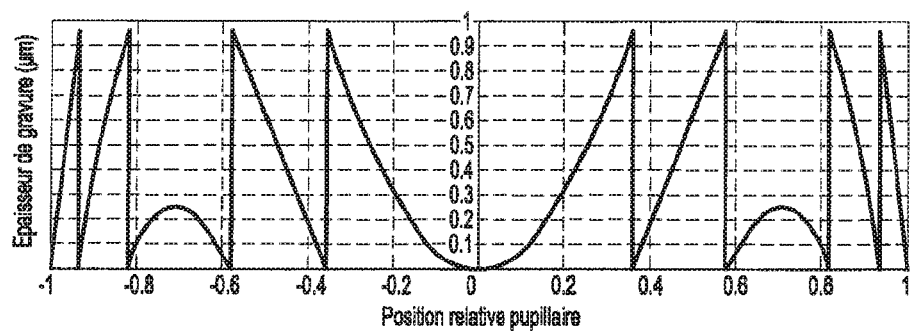
FIGS. 20a through 20d: profiles of a diffractive object for introducing a defect according to the invention, according to different manufacturing methods.
Figure 20B:
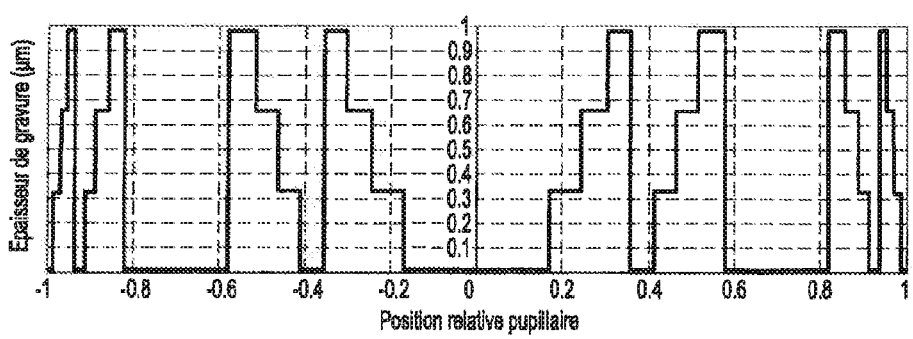
Figure 20C:
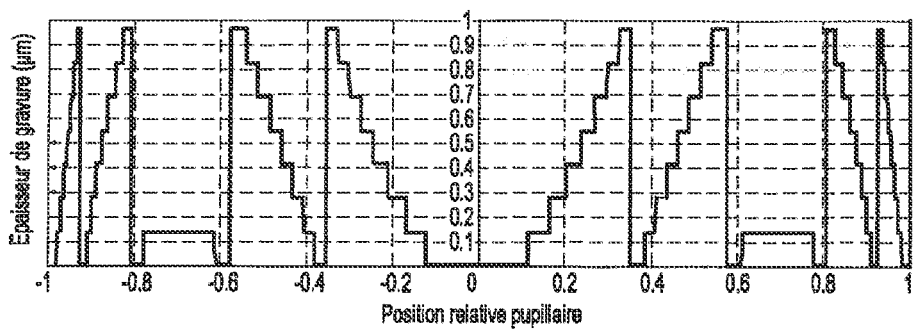
Figure 20D:
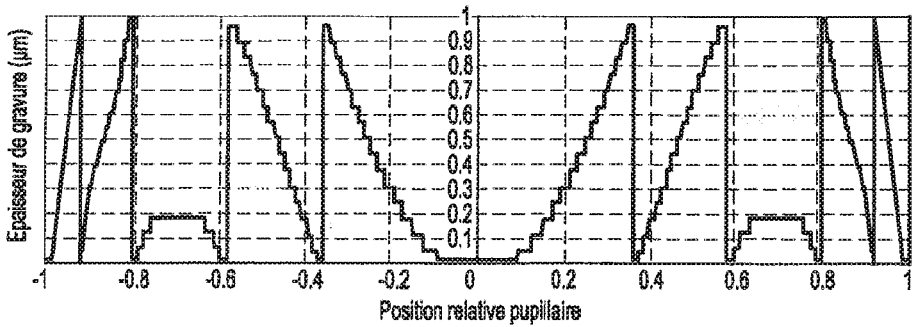

It is also possible to introduce the defect with a diffractive object. This diffractive object can be a flat plate whereof one surface is diffractive thanks to the etching of a pattern. An example of such a pattern is represented, in the form of a diffraction grating of variable pitch, in FIG. 20a. The thickness of the pattern to be etched is equal to λ/(n−1), which corresponds to a phase shift of 2π. The phase shift is linked to the path difference by the relation:

$$\Delta\phi = \frac{2\pi\delta}{\lambda}$$

Figure 25:
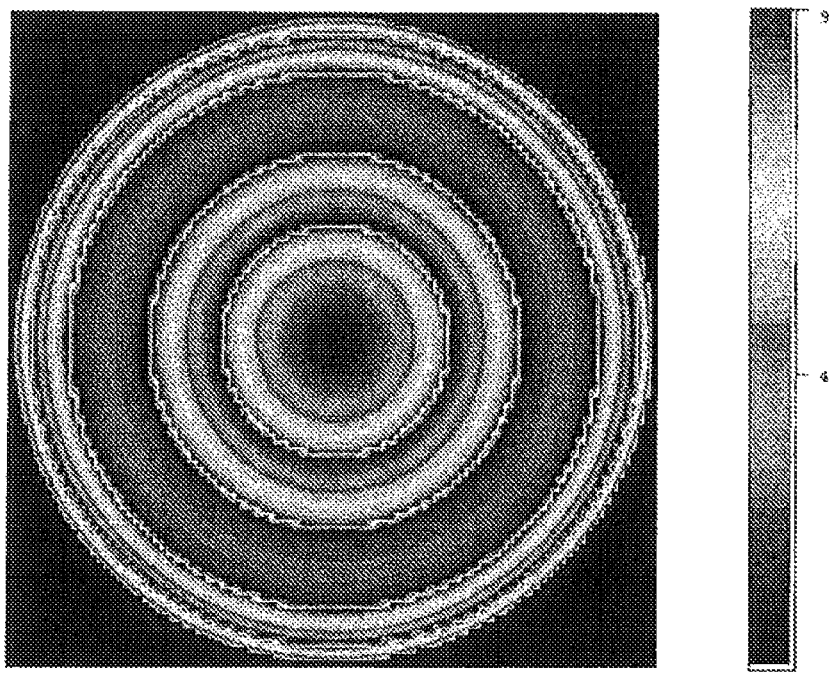
FIG. 25: a diffractive object according to FIG. 9 represented in two dimensions, where the scale to the right of the figure gives the amplitude of the thickness of the diffractive phase object in wavelength units and where the wavelength is equal to 0.1 nanometer.

The diffractive object represented in slices in FIGS. 20a through 20d and in two dimensions in FIG. 25 corresponds to a blazed grating, which means that the diffraction efficiency will be 100% for the order of diffraction for which the diffractive object has been blazed. Furthermore, it is well known to the person skilled in the art that in producing such an optical element, it is possible to produce it with greater or lesser precision, which will adjust the diffraction efficiency. The greater the number of levels used to produce this element, the closer the object will be to a blazed grating and the closer the efficiency will be to 100%. For example, in FIGS. 20b, 20c and 20d, various levels are represented (4, 8 and 16 levels, respectively). It is possible to produce the diffractive object with one of the profiles represented in one of these figures. The only difference between these three objects is the diffraction efficiency. Depending on the number of levels in question, there will be more or less diffracted energy in the various orders of diffraction. A blazed grating is an echelette grating.

Moreover, in the context of Trefoil, Quadrifoil, Pentafoil, etc., it is possible to introduce the wavefront deformations mechanically. In essence, to take the example of a Trefoil, it is possible to introduce it on a flat and parallel plate by exerting three forces on either side of the plate at 120°, given an offset of 60° between the forces applied on both sides. For Quadrifoil, Pentafoil and the like, it is correspondingly appropriate to exert four forces, five forces, and so on, evenly distributed on the periphery of the phase object, which is preferably circular.

Figure 21A:
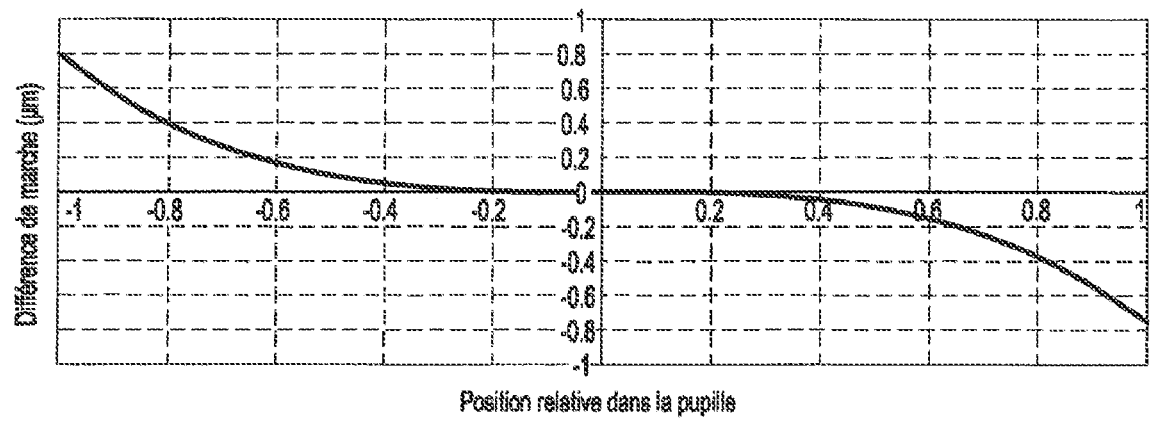
FIGS. 21a through 21c: slice profiles, in a plane perpendicular to the main optical axis of the optical system, of a phase object according to FIGS. 13 through 15, respectively, showing the path difference in micrometers as a function of a relative position in the pupil, itself directly proportional to a thickness in its profile of a plate playing this role of a phase object in the context of a refractive object.
Figure 21B:
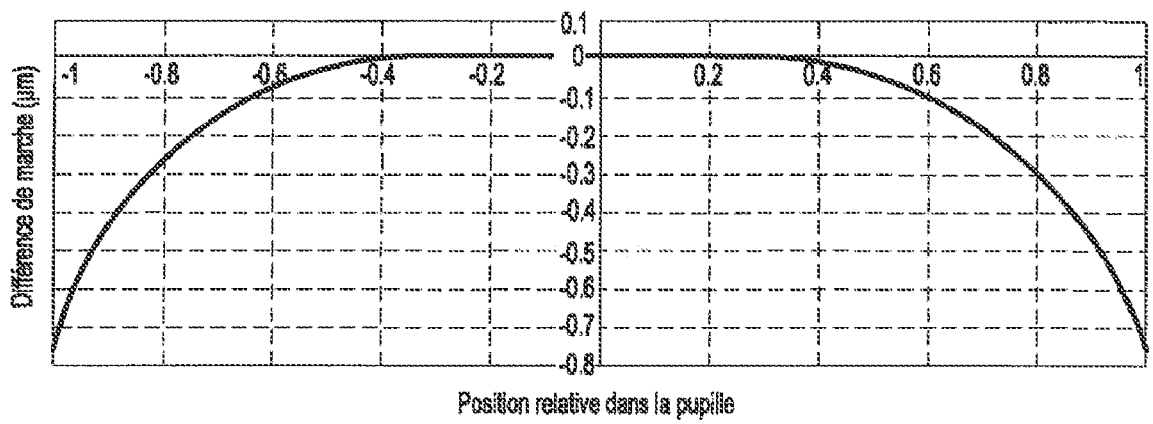
Figure 21C:
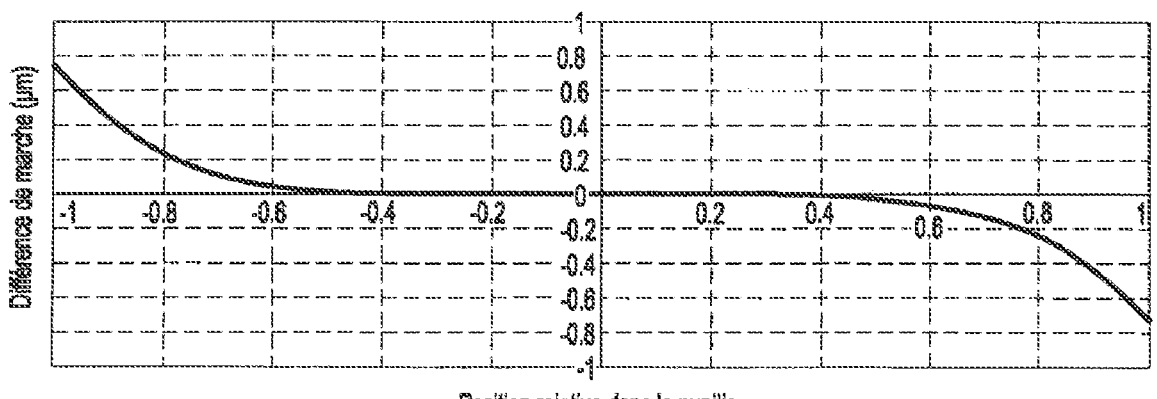

FIGS. 21a through 21c show, for these deformations or modifications, thicknesses of the slice profiles, in a plane perpendicular to the main optical axis of the optical system, of a phase object according to FIGS. 13 through 15, respectively. The path difference as a function of a relative position in the pupil is directly proportional to a thickness in its profile of a plate playing this role of a phase object. It is noted that for thickness variations given in micrometers, and up to almost one micrometer, these thickness variations are substantial. They can lead to industrial-scale production that is accessible in the context of currently controlled manufacturing tolerances.

Figure 22A:
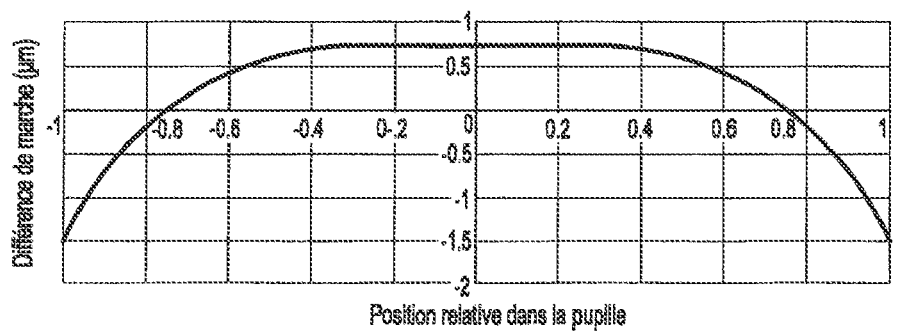
FIGS. 22a through 22b: slice profiles, in a plane perpendicular to the main optical axis of the optical system, of a phase object comprising a pure spherical aberration, respectively showing the path difference and a thickness variation in its profile of a plate playing this role of a refractive phase object, as a function of a relative position in the pupil.
Figure 22B:
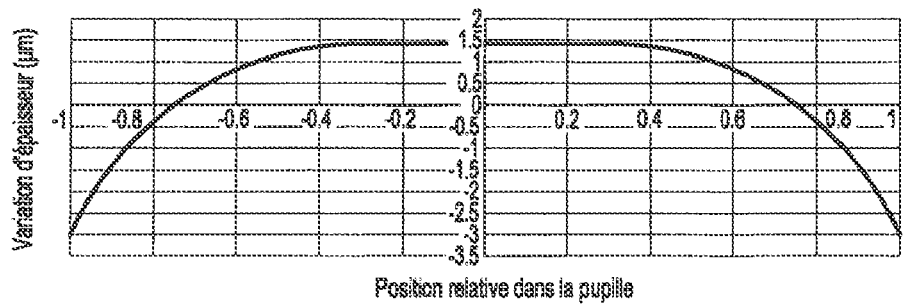
Figure 23A:
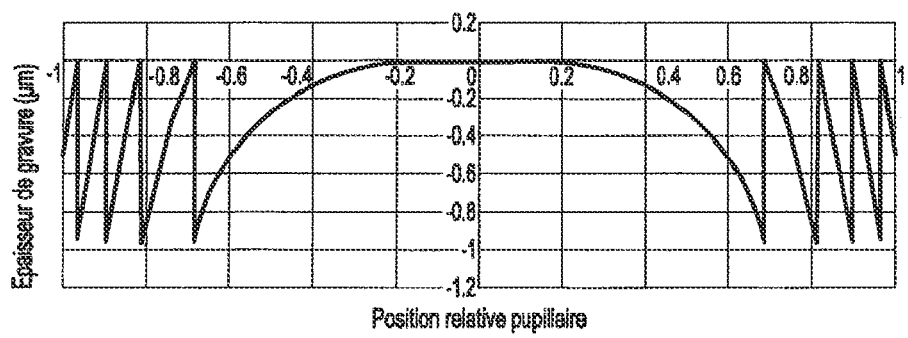
FIGS. 23a through 23b: slice profiles, in a plane perpendicular to the main optical axis of the optical system, of a blazed diffractive phase object showing a thickness in its profile of a plate playing this role of a phase object as a function of a relative position in the pupil, for a theoretical embodiment and for a practical embodiment on four levels.
Figure 23B:
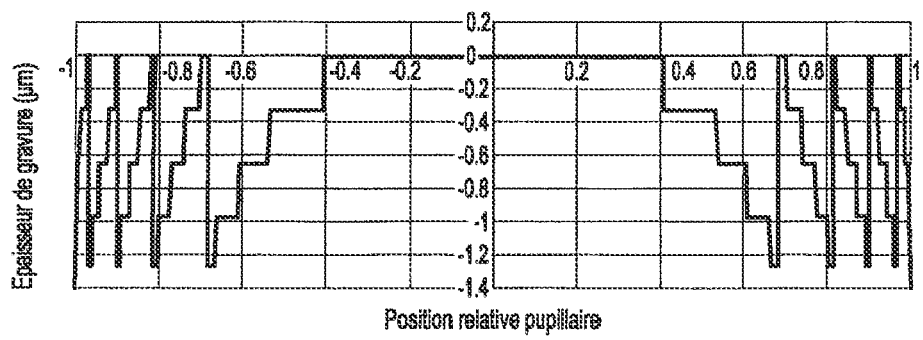
Figure 24A:
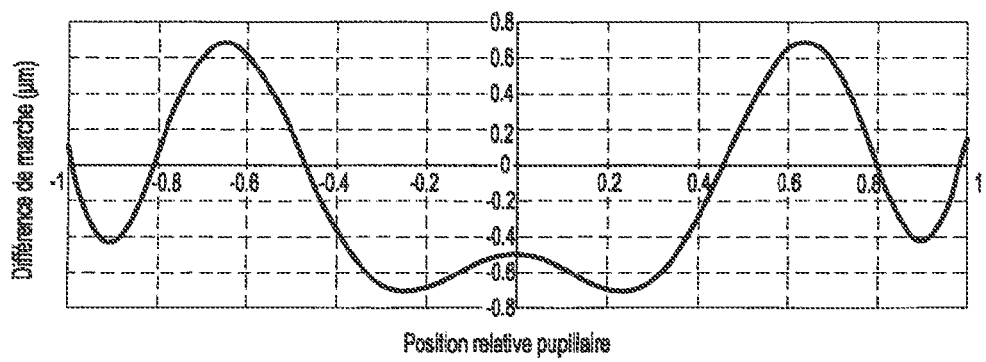
FIGS. 24a through 24b: slice profiles, in a plane perpendicular to the main optical axis of the optical system, of a phase object according to FIGS. 16 through 17, respectively, showing the path difference in micrometers as a function of a relative position in the pupil, itself directly proportional to a thickness in its profile of a plate playing this role of a phase object in the context of a refractive object.
Figure 24B:
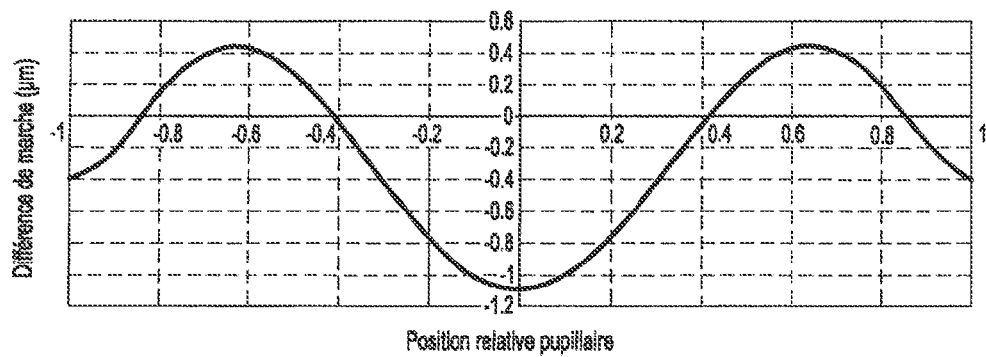

FIGS. 22a and 22b and FIGS. 23a and 23b show, with the same considerations as above for a pure spherical aberration, a $\rho^4$ term only for the path difference, the thickness variations of a refractive—FIGS. 22a and 22b—and diffractive—FIGS. 23a and 23b —phase object.

The invention claimed is:

1. An optical system processing incoherent light divided into at least a first and a second spectral bands, a center wavelength value of one spectral band being different from a center wavelength value of other spectral band, comprising:
    a modulation translation transfer function (MTF);
    a lens to focus the incoherent light received from an object onto an image plane;
    a storage device to store a representation of light images due to said at least first and second spectral bands received at the image plane; and
    a device to increase a depth of field of the optical system, said device comprising:
        an optical phase mask interposed between the object and the image plane, said optical phase mask having a quality of increasing the depth of field of the optical system having the effect of-modifying the modulation transfer function of the optical system such that the modified modulation transfer function is sensitive to a distance between the object and the lens;
        wherein the modified modulation transfer function has a value higher than a first threshold for an object located in a first distance range near the lens and for the first spectral band;
        wherein the modified modulation transfer function has a value higher than a second threshold for an object located in a second distance range far from the lens and for the second spectral band;
        wherein the first and second distance ranges being larger with the presence of the optical phase mask than if the optical phase mask was not present in the optical system; and
    a processor to measure or correct all or part of a longitudinal chromatic aberration effect on an image, the processor being connected to the storage device to restore the representation of a light image received at the image plane.

2. The optical system of claim 1, wherein the incoherent light is divided into at least three spectral bands, a center wavelength value of a third spectral band being different from the center wavelength values of the first and second spectral bands; wherein the optical phase mask having the quality of increasing the depth of field of the optical system having the effect of modifying the modulation transfer function of the optical system such that the modified modulation transfer function has a value higher than a third threshold for an object located in a third intermediate distance range and for the third spectral band.

3. The optical system of claim 1, wherein the optical phase mask is a diffractive mask.

4. The optical system of claim 1, wherein the first threshold is equal to the second threshold.

5. The optical system of claim 2, wherein at least two of the first, second and third thresholds are equal to each other.

6. The optical system of claim 1, wherein the processor filters the image to give sharpness to a spectral band as measured in another spectral band.

7. The optical system of claim 1, wherein the optical phase mask is placed in a location of a main plane of the optical system, between the object and the storage device.

8. The optical system of claim 1, wherein the optical phase mask is placed in a location of an image plane of a main plane of the optical system, between the object and the storage device.

9. The optical system of claim 1, wherein the optical phase mask is a mask that produces a quartic modulation.

10. The optical system of claim 1, wherein the storage device comprises a charge transfer device, a film, or a video camera.

11. The optical system of claim 1, wherein the processor comprises a digital filter.

12. The optical system of claim 1, wherein the optical phase mask is operable to provide more high spatial frequencies to the modulation translation transfer function of the optical system.

13. The optical system of claim 1, wherein the optical phase mask introduces a defect greater than a defocus.

14. The optical system of claim 13, wherein said defect is either spherical aberration or coma aberration.

15. The optical system of claim 1, wherein the processor adapts a digital correction based on a distance between the object and the lens.

* * * * *